United States Patent
Inagaki

(10) Patent No.: US 9,890,478 B2
(45) Date of Patent: Feb. 13, 2018

(54) WET TYPE NONWOVEN FABRIC AND FILTER

(75) Inventor: Kenji Inagaki, Ibaraki (JP)

(73) Assignee: Teijin Fibers Limited, Osaka (JP)

( * ) Notice: Subject to any disclaimer, the term of this patent is extended or adjusted under 35 U.S.C. 154(b) by 974 days.

(21) Appl. No.: 12/596,100

(22) PCT Filed: Apr. 11, 2008

(86) PCT No.: PCT/JP2008/057556
§ 371 (c)(1), (2), (4) Date: Oct. 15, 2009

(87) PCT Pub. No.: WO2008/130019
PCT Pub. Date: Oct. 30, 2008

(65) Prior Publication Data
US 2010/0133173 A1    Jun. 3, 2010

(30) Foreign Application Priority Data

Apr. 17, 2007   (JP) .................... 2007-108133

(51) Int. Cl.
| | |
|---|---|
| *B01D 39/02* | (2006.01) |
| *D04H 5/06* | (2006.01) |
| *B32B 5/00* | (2006.01) |
| *D01F 6/62* | (2006.01) |
| *B01D 39/16* | (2006.01) |
| *D01F 8/04* | (2006.01) |
| *D01F 8/14* | (2006.01) |
| *D21H 13/24* | (2006.01) |
| *D21H 15/02* | (2006.01) |
| *D21H 27/08* | (2006.01) |

(52) U.S. Cl.
CPC ............ *D01F 6/62* (2013.01); *B01D 39/1623* (2013.01); *D01F 8/04* (2013.01); *D01F 8/14* (2013.01); *D21H 13/24* (2013.01); *D21H 15/02* (2013.01); *D21H 27/08* (2013.01); *B01D 2239/064* (2013.01); *Y10T 442/609* (2015.04)

(58) Field of Classification Search
None
See application file for complete search history.

(56) References Cited

U.S. PATENT DOCUMENTS 7,622,188 B2 * 11/2009 Kamiyama et al. .......... 428/370
2005/0142973 A1   6/2005 Bletsos et al.
(Continued)

FOREIGN PATENT DOCUMENTS

| CN | 1922363 A | 2/2007 |
|---|---|---|
| EP | 1 731 634 A1 | 12/2006 |

(Continued)

*Primary Examiner* — Dirk Bass
(74) *Attorney, Agent, or Firm* — Sughrue Mion, PLLC

(57) ABSTRACT

The present invention is a wet type nonwoven fabric that includes two or more kinds of fibers, wherein the wet type nonwoven fabric includes a short fiber A that is constituted of a fiber-forming thermoplastic polymer and has a fiber diameter D of from 100 to 1000 nm and the ratio of a fiber length L to the fiber diameter D, L/D, in the range of from 100 to 2500 in from 4 to 50% by weight relative to the total weight of the nonwoven fabric, and a binder fiber B that has a single fiber fineness of 0.1 dtex or less in from 10 to 50% by weight relative to the total weight of the nonwoven fabric.

14 Claims, 1 Drawing Sheet

(56) References Cited

U.S. PATENT DOCUMENTS

| | | |
|---|---|---|
| 2006/0057350 A1 | 3/2006 | Ochi et al. |
| 2007/0196401 A1 | 8/2007 | Naruse et al. |
| 2007/0196649 A1 | 8/2007 | Kamiyama et al. |

FOREIGN PATENT DOCUMENTS

| | | |
|---|---|---|
| EP | 1 743 975 A1 | 1/2007 |
| JP | 2003-253555 A | 9/2003 |
| JP | 2004-162244 A | 6/2004 |
| JP | 2004-181341 A | 7/2004 |
| JP | 3678511 B2 | 5/2005 |
| JP | 2005-270965 A | 10/2005 |
| JP | 2005-299069 A | 10/2005 |
| JP | 2006-241654 A | 9/2006 |
| JP | 2007-21400 A | 2/2007 |
| JP | 2007-107160 A | 4/2007 |
| WO | 2004/038073 A1 | 5/2004 |
| WO | 2005/040495 A1 | 5/2005 |
| WO | 2005/080679 A1 | 9/2005 |
| WO | 2005/095686 A1 | 10/2005 |
| WO | 2007/037512 A1 | 4/2007 |

\* cited by examiner

WET TYPE NONWOVEN FABRIC AND FILTER

CROSS REFERENCE TO RELATED APPLICATION

This application is a National Stage of International Application No. PCT/JP2008/057556, filed Apr. 11, 2008, the contents of all of which are incorporated herein by reference in their entirety.

TECHNICAL FIELD

The present invention relates to a wet type nonwoven fabric that includes two or more kinds of fibers, wherein the wet type nonwoven fabric can give a filter excellent in the collection efficiency, and to a filter constituted by using the wet type nonwoven fabric.

BACKGROUND ART

Until now, wet type nonwoven fabrics have largely been used for the application of various types of filters. Regarding raw materials for wet type nonwoven fabrics, polyester fiber, micro glass, polyethylene synthetic pulp, and para-aramid synthetic pulp are known (see, for example, Patent Documents 1 and 2).

However, when a conventional wet type nonwoven fabric including a polyester fiber is used as a filter, since the pore diameter of pores appearing on the surface of the wet type nonwoven fabric is nonuniform, there is such problem that a sufficient collection efficiency cannot be obtained. On the other hand, when a wet type nonwoven fabric including micro glass or synthetic pulp is used as a filter, since the fiber length and fiber diameter of the micro glass or synthetic pulp is nonuniform, there is such problem that the quality of the filter is insufficient.

Meanwhile, recently, the research and development have energetically been performed for fibers having a small fineness (see, for example, Patent Documents 3-5).

Patent Document 1: JP-A-2006-241654
Patent Document 2: Japanese Patent No. 3678511
Patent Document 3: JP-A-2004-162244
Patent Document 4: WO 2005/095686
Patent Document 5: WO 2005/080679

DISCLOSURE OF THE INVENTION

Purposes of the present invention are to provide a wet type nonwoven fabric including two or more kinds of fibers, wherein the wet type nonwoven fabric can give a filter excellent in a collection efficiency, and to provide a filter constituted by using the wet type nonwoven fabric. These purposes can be achieved by the wet type nonwoven fabric and filter of the invention.

The wet type nonwoven fabric of the invention is a wet type nonwoven fabric including two or more kinds of fibers, wherein the wet type nonwoven fabric includes a short fiber A that is constituted of a fiber-forming thermoplastic polymer and has a fiber diameter D ranging from 100 to 1000 nm and the ratio of a fiber length L to the fiber diameter D, L/D, ranging from 100 to 2500 in from 4 to 50% by weight relative to the total weight of the nonwoven fabric, and a binder fiber B that has a single fiber fineness of 0.1 dtex or more in from 10 to 50% by weight relative to the total weight of the nonwoven fabric.

Here, the short fiber A is preferably one formed by cutting a conjugate fiber including an island component that is constituted of a fiber-forming thermoplastic polymer and has an island diameter D of from 100 to 1000 nm, and a sea component constituted of a polymer that is readily soluble in an aqueous alkali solution as compared with the fiber-forming thermoplastic polymer, and then subjecting the conjugate fiber to an alkali reduction processing to dissolve and remove the sea component. Further, in the conjugate fiber, the sea component is preferably constituted of polyethylene terephthalate copolymerized with 5-sodium sulfonic acid in from 6 to 12% by mole and polyethylene glycol having a molecular weight of from 4000 to 12000 in from 3 to 10% by weight. Furthermore, in the conjugate fiber, the island component is preferably constituted of polyester. In the conjugate fiber, the number of the island is preferably 100 or more. In the conjugate fiber, the conjugate weight ratio between the sea component and the island component (sea:island) is preferably in the range of from 20:80 to 80:20.

In the wet type nonwoven fabric of the invention, the binder fiber B is preferably an unstretched polyester fiber formed by spinning polyester polymer at a fiber spinning rate of from 800 to 1200 m/min. Further, the binder fiber B is preferably a core-sheath type conjugate fiber in which the core portion is formed of polyethylene terephthalate and the sheath portion is formed of copolymerized polyester. Furthermore, the basis weight of the wet type nonwoven fabric is preferably in the range of from 20 to 500 $g/m^2$. On the surface of the wet type nonwoven fabric, the ratio between the maximum pore diameter Ma and the average pore diameter Av, Ma/Av, is preferably 2 or less.

The filter of the invention is a filter constituted by using the aforementioned wet type nonwoven fabric.

BEST MODE FOR CARRYING OUT THE INVENTION

Figure 1:
FIG. 1 is an electron microscopic picture of the cross-section of a wet type nonwoven fabric obtained in Example 1.

In the present invention, it is important that the short fiber A is constituted of a fiber-forming thermoplastic polymer, has a fiber diameter D (the diameter of a single fiber) of from 100 to 1000 nm (preferably from 300 to 800 nm, particularly preferably from 550 to 800 nm) and has been cut so that the ratio of the fiber length L (nm) to the fiber diameter D (nm), L/D, is in the range of from 100 to 2500 (preferably from 500 to 2000). When the fiber diameter D exceeds 1000 nm, the pore diameter of pores appearing on the surface of the wet type nonwoven fabric is nonuniform (that is, the ratio between the average pore diameter and the maximum pore diameter is great), unpreferably. Inversely, a fiber diameter (D) less than 100 nm leads to easy dropout of the fiber from a net upon papermaking, unpreferably. Further, when the ratio L/D exceeds 2500, fibers intertwist with each other upon the papermaking to lead to poor dispersion and non-uniform pore diameters of pores (that is, the ratio between the average pore diameter and the maximum pore diameter is great) appearing on the surface of the wet type nonwoven fabric, unpreferably. Inversely, when the ratio L/D is smaller than 100, the linkage between a fiber and another fiber becomes extremely weak to make transition from a wire part to blanket difficult upon the papermaking process to lower the process stability, unpreferably.

The fiber diameter D can be measured by taking a picture of a fiber cross-section with a transmission electron microscope (TEM) at a magnification of ×30000. At this time, in the case of a TEM having a length-measuring function, the measurement can be performed with the aid of the length-measuring function. In the case of a TEM having no length-measuring function, the measurement may be performed by making an enlarged copy of the taken picture and measuring the copy with a ruler while taking the reduced scale into consideration.

On this occasion, when a single fiber has the transverse cross-sectional form of an atypical cross-section other than a circular cross-section, the diameter of the circumcircle for the transverse cross-section of the single fiber is to be used as the fiber diameter D. Incidentally, a fiber diameter in the range of from 100 to 1000 nm corresponds to the fineness from 0.0001 to 0.01 dtex.

A method for producing fibers having a fiber diameter D of from 100 to 1000 nm as described above is not particularly limited, but the method disclosed in WO 2005/095686 pamphlet is preferable. That is, a fiber is preferably one formed by cutting a conjugate fiber that has an island component constituted of a fiber-forming thermoplastic polymer and an island diameter D of from 100 to 1000 nm and a sea component that is more readily soluble to an aqueous alkali solution as compared to the fiber-forming thermoplastic polymer (hereinafter, it may sometimes be referred to as "readily soluble polymer"), and then subjecting the cut product to an alkali reduction processing to dissolve and remove the sea component, from the standpoint of the fiber diameter and uniformity thereof. Meanwhile, the island diameter may be measured by taking a picture of the transverse section of a single fiber of the conjugate fiber with a transmission electron microscope. When an island has an atypical cross-section other than a circular cross-sectional form, the diameter of the circumcircle thereof is used as the island diameter D.

Here, the ratio of the dissolution rate of the aqueous alkali solution readily soluble polymer that forms the sea component relative to that of the fiber-forming thermoplastic polymer that forms the island component is preferably 200 or more (preferably from 300 to 3000), because the separation of islands becomes good. When the dissolution rate is less than 200 times, since a separated island component at the surface part of fiber cross-section is dissolved due to a small fiber diameter in the period of dissolving the sea component at the central part of the fiber cross-section, in spite of the reduction equivalent to the sea, the sea component at the central part of the fiber cross-section cannot completely be removed, which leads to the thickness unevenness of the island component and solvent corrosion of the island component itself, and a short fiber having a uniform fiber diameter might not be obtained.

Regarding the readily soluble polymer that forms the sea component, there can be mentioned polyesters, aliphatic polyamides, polyolefins such as polyethylene and polystyrene that have particularly good fiber-forming properties as preferable examples. Further, as specific examples, polylactic acid, ultrahigh molecular weight polyalkyleneoxide condensed polymer, copolymerized polyester of a polyalkylene glycol-based compound and 5-sodium sulfoisophthalic acid are readily soluble in an aqueous alkali solution and preferable. The aqueous alkali solution means here an aqueous solution of potassium hydroxide, sodium hydroxide and the like. In addition to these, examples of the combination of a sea component and a solution that dissolves the sea component include formic acid for aliphatic polyamides such as Nylon 6 and Nylon 66, trichloroethylene and the like for polystyrene, hydrocarbon-based solvents such as hot toluene and xylene for polyethylenes (particularly high-pressure method low-density polyethylene and linear low-density polyethylene), and hot water for polyvinyl alcohol and ethylene-modified vinyl alcohol-based polymer.

Among polyester-based polymers, preferable is polyethylene terephthalate-based copolymerized polyester that is formed by copolymerizing 5-sodium sulfoisophthalic acid in from 6 to 12% by mole and polyethylene glycol having a molecular weight of from 4000 to 12000 in from 3 to 10% by weight, and that has an intrinsic viscosity of from 0.4 to 0.6. Here, 5-sodium sulfoisophthalic acid contributes to enhance the hydrophilicity and melt viscosity, and polyethylene glycol (PEG) enhances the hydrophilicity. A PEG having a greater molecular weight exhibits a hydrophilicity-increasing action that is considered to be caused by the higher-order structure thereof, but deteriorates reaction properties to give a blend system. Therefore, there may occur problems in heat-resisting properties and spinning stability. In addition, the copolymerized amount of 10% by weight or more leads to the melt viscosity-lowering action, unpreferably.

Regarding the hardly soluble polymer forming the island component, polyamides, polyesters, polyolefins and the like are mentioned as suitable examples. Specifically, for such applications that require mechanical strength and heat-resisting properties, preferable polyesters include polyethylene terephthalate (hereinafter, it may be referred to as "PET"), polytrimethylene telephthalate, polybutylene telephthalate, polyethylene naphthalate, and copolymers, which include these as the main repeating unit, with aromatic dicarboxylic acid such as isophthalic acid and 5-sulfoisophthalic acid metal salt, aliphatic dicarboxylic acid such as adipic acid and sebacic acid, hydroxycarboxylic acid condensate such as ε-caprolactone, or a glycol component such as diethylene glycol, trimethylene glycol, tetramethylene glycol and hexamethylene glycol. Regarding polyamides, aliphatic polyamides such as Nylon 6 and Nylon 66 are preferable. Meanwhile, polyolefins have such characteristics that they are hardly corroded by an acid and alkali, and that can be used as a binder component after having been taken out as a ultrathin fiber because of a relatively low melting point thereof, and there can be mentioned as preferable examples high-density polyethylene, medium-density polyethylene, high-pressure method low-density polyethylene, linear low-density polyethylene, isotactic polypropylene, ethylene-propylene copolymer, ethylene copolymer with a vinyl monomer such as maleic anhydride, and the like. In particular, since polyesters such as polyethylene terephthalate, polytrimethylene telephthalate, polybutylene telephthalate, polyethylene terephthalate isophthalate having an isophthalic acid copolymerization ratio of 20% by mole or less, polyethylene naphthalate, and aliphatic polyamides such as Nylon 6 and Nylon 66 are provided with heat-resisting properties and mechanical properties due to a high melting point, they can be applied, preferably, to such applications that require heat-resisting properties and strength, as compared with ultrathin-fibrillated fibers constituted of polyvinyl alcohol/polyacrylonitrile blend spinning fiber. Meanwhile, the island component may have an atypical cross-section such as a triangular cross-section and flat cross-section, in addition to a circular cross-section.

A polymer that forms the sea component and a polymer that forms the island component may contain various additives such as an organic filler, an oxidation inhibitor, a heat stabilizer, a light stabilizer, a flame retardant, a lubricant, an antistatic agent, an anticorrosive agent, a crosslinking agent, a foaming agent, a fluorescent agent, a surface-smoothing agent, a surface gloss-improving agent, and a mold release-improving agent such as fluorine-containing resin according to need in such a range that gives no influence on fiber-making properties or physical properties of the ultrathin short fiber after extraction.

In the aforementioned sea-island type conjugate fiber, the melt viscosity of the sea component is preferably greater than that of the island component polymer at the melt fiber-spinning. When they are in such a relationship, even if the conjugate weight ratio of the sea component is small such as less than 40%, there hardly occurs such phenomenon that islands are connected with each other or most part of the island component are connected to give a product different from a sea-island type conjugate fiber.

The preferable melt viscosity ratio (sea/island) is in the range of from 1.1 to 2.0, in particular from 1.3 to 1.5. When the ratio is less than 1.1, island components tend to be joined with each other at fiber-spinning, and, on the other hand, when it exceeds 2, a spinning tone tends to lower because of a too great difference in viscosities.

Next, the number of the island is preferably 100 or more (more preferably from 300 to 1000). Further, the sea-island conjugate weight ratio (sea:island) thereof is preferably in the range of from 20:80 to 80:20. When the ratio is in such range, the thickness of the sea component between islands can be made thin to make the dissolution and removal of the sea component easy and to make the conversion of the island component to a ultrathin fiber easy, preferably. Meanwhile, when the ratio of the sea component exceeds 80%, the thickness of the sea component becomes too great, and, on the other hand, when it is less than 20%, the amount of the sea component becomes too small to lead to the easy generation of joining between islands.

Regarding a spinneret for use in the melt spinning, any one having a group of hollow pins or a group of fine pores for forming the island component may be employed. For example, such spinneret may be used that island components extruded from hollow pins or fine pores and sea component flows, the channel of which is designed in such a form as filling the space between island components, are joined and compressed to form the sea-island cross-section. The discharged sea-island type conjugate fiber is solidified by cooling wind, taken up by a rotating roller or ejector having been set so as to have an intended take-up speed, to give an unstretched yarn. The take-up speed is not particularly limited, but is desirably from 200 to 5000 m/min. The take-up speed of less than 200 m/min leads to low productivity, and that of more than 5000 m/min leads to low fiber spinning stability.

Corresponding to the application and purpose of an ultrathin fiber obtained after extracting the sea component, the obtained unstretched yarn may directly be provided to a cutting process or a subsequent extraction process, or may be provided to a cutting process or a subsequent extraction process via a stretching process and/or heat treatment process in order to be met an intended strength, elongation degree and/or thermal contraction properties. The stretching process may be a separated stretching system in which fiber spinning and stretching are performed in separate steps, or a direct stretching system in which stretching is performed just after fiber spinning in one process.

Next, such conjugate fiber is cut so that the ratio of the fiber length L relative to the island diameter D, L/D, is in the range of from 100 to 2500. For the cutting, an unstretched or stretched yarn itself, or a tow formed by bundling yarns in a unit of from several dozen to multimillion is preferably cut with a guillotine cutter or a rotary cutter.

The short fiber A having the fiber diameter D can be obtained by subjecting the cut conjugate fiber to an alkali reduction processing. On this occasion, in the alkali reduction processing, the ratio between the fiber and the alkali liquid (bath ratio) is preferably from 0.1 to 5%, further preferably from 0.4 to 3%. The ratio of less than 0.1% leads to frequent contact between the fiber and the alkali liquid, but might lead to difficulty in process properties such as water discharge. On the other hand, the ratio exceeding 5% might generate the intertwist of fibers in the alkali reduction processing due to a too much fiber amount. Meanwhile, the bath ratio is defined according to the formula below.

$$\text{Bath ratio}(\%)=(\text{fiber mass}(gr)/\text{aqueous alkali solution mass}(gr))\times 100$$

The treatment time of the alkali reduction processing is preferably from 5 to 60 minutes, more preferably from 10 to 30 minutes. The time of less than 5 minutes might lead to an insufficient alkali reduction. On the other hand, the time of 60 minutes or longer might lead to the reduction of even the island component.

In the alkali reduction processing, the alkali concentration is preferably from 2% to 10%. The concentration of less than 2% might lead to extremely low reduction speed due to an inadequate alkali. On the other hand, the concentration of more than 10% might also lead to even the reduction of the island part due to an excessive alkali reduction.

Regarding the alkali reduction method, there is a method in which a cut conjugate fiber is thrown into an alkali liquid and is subjected to an alkali reduction processing under predetermined conditions for predetermined time followed by dehydration process once and then thrown again into water, which is neutralized and diluted using an organic acid such as acetic acid or oxalic acid and finally dehydrated, or a method in which the fiber is subjected to an alkali reduction processing for a predetermined time followed by a neutralization processing firstly and further dilution by pouring water and then is dehydrated. In the former, since the processing is performed in a batch system, manufacturing (processing) in a small amount is possible, but the neutralization requires time to lead to a little low productivity. The latter makes a semi-continuous production possible, but there is such problem that a large volume of an aqueous acidic solution at neutralization processing and a large volume of water for dilution are required. Processing facilities are not limited in any way, but, from the standpoint of preventing fiber dropout at the dehydration, the use of mesh-like article (for example, an alkali non-hydrolyzable bag) having an aperture ratio (the ratio of opening portion per unit area) of from 10 to 50% as disclosed in Japanese Patent No. 3678511 is preferable. When the aperture ratio is less than 10%, water passes through the mesh at an extremely low rate, and when it exceeds 50%, the dropout of a fiber might occur.

Further, in order to heighten the dispersibility of fibers, after the alkali reduction processing, a dispersing agent (for example, type YM-81 by TAKAMATSU OIL & FAT) is preferably adhered onto the fiber surface in from 0.1 to 5.0% by weight relative to the fiber weight.

Next, as the binder fiber B for use in the nonwoven fabric of the invention, an unstretched fiber (having birefringence index (Δn) of 0.05 or less) or a conjugate fiber, which has a single fiber fineness of 0.1 dtex (fiber diameter of 3 μm) or more, can be employed.

Here, in the binder fiber B constituted of an unstretched fiber or a conjugate fiber, the single fiber fineness is preferably from 0.2 to 3.3 dtex (more preferably from 0.5 to 1.7 dtex). Further, the fiber length of the binder fiber B is preferably from 1 to 20 mm (more preferably from 3 to 10 mm). Meanwhile, when a binder fiber constituted of an unstretched fiber is used, a thermocompression processing is required after a dryer after papermaking, therefore calendar/emboss treatment is preferably given after the papermaking.

Regarding an unstretched fiber of the above-described binder fiber B, an unstretched polyester fiber spun at a fiber spinning rate of preferably from 800 to 1200 m/min, more preferably from 900 to 1150 m/min is mentioned. Here, regarding polyester for use in the unstretched fiber, polyethylene terephthalate, polytrimethylene telephthalate and polybutylene telephthalate are mentioned. Among these, due to productivity and dispersibility in water, polyethylene terephthalate and polytrimethylene telephthalate are preferable.

Regarding the conjugate fiber of the binder fiber B, a core-sheath type conjugate fiber, in which a polymer component that is fusion-bonded by a heat treatment at from 80 to 170° C. provided after papermaking to exhibit an adhesive effect (for example, amorphous copolymerized polyester) is arranged for the sheath portion and another polymer having a melting point higher than that of the polymer component by 20° C. or more (for example, ordinary polyesters such as polyethylene terephthalate, polytrimethylene telephthalate and polybutylene telephthalate) is arranged for the core portion, is preferable. Meanwhile, the binder fiber B may be a binder fiber publicly known for core-sheath type conjugate fibers, eccentric core-sheath type conjugate fibers and side-by-side type conjugate fibers, in which the binder component (low melting point component) constitutes the whole or a part of the surface of a single fiber.

Here, the above-described amorphous copolymerized polyester is obtained as a random or block copolymer of an acid component such as telephthalic acid, isophthalic acid, 2,6-naphthalenedicarboxylic acid, 5-sodium sulfoisophthalic acid, adipic acid, sebacic acid, azelaic acid, dodecanoic acid and 1,4-cyclohexanedicarboxylic, and a diol component such as ethylene glycol, 1,3-propanediol, 1,4-butanediol, 1,5-pentanediol, 1,6-hexanediol, diethylene glycol, 1,4-cyclohexane diol and 1,4-cyclohexane dimethanol. Among these, the use of telephthalic acid or isophthalic acid and ethylene glycol or diethylene glycol, that have widely been used conventionally, as the main component is preferable from the standpoint of cost. Such copolymerized polyesters have the glass transition temperature in the range of from 50 to 100° C. not to show distinct crystalline melting point.

In the wet type nonwoven fabric of the invention, it is important that the short fiber A is included in from 4 to 50% by weight (preferably from 5 to 50% by weight, particularly preferably from 10 to 30% by weight) of the total weight of the nonwoven fabric, and that the binder fiber B is included in from 10 to 50% by weight (preferably from 20 to 40% by weight) of the total weight of the nonwoven fabric.

When the content of the short fiber A is less than 4% by weight, the pore diameter of pores that appear on the surface of the wet type nonwoven fabric becomes nonuniform, unpreferably. Inversely, when the content of the short fiber A exceeds 50% by weight, although it is possible to obtain a nonwoven fabric having uniform formation, the freeness at papermaking is extremely deteriorated to lead to low productivity, or, although the collection efficiency is enhanced, the pressure loss is also increased to shorten the lifetime as a commercial product, unpreferably.

On the other hand, when the content of the binder fiber B is less than 10% by weight, it is an insufficient amount for forming a nonwoven fabric, leading not only to insufficient strength but also to easy occurrence of fiber dropout and napping, unpreferably. Inversely, when the content of the binder fiber B exceeds 50% by weight, after the heat treatment process, since the adhesion force between fibers is high, the short fiber A is in such a state that it is coated by the binder fiber B not to be allowed to exhibit the performance as the short fiber A, unpreferably.

In the wet type nonwoven fabric of the invention, various kinds of synthetic fibers (polyethylene terephthalate, polytrimethylene telephthalate, Nylon, olefin-based, aramid-based), natural pulp such as wood pulp and linter pulp, synthetic pulp containing aramid or polyethylene as a main component may be employed as a fiber other than the short fiber A and binder fiber B, when the content thereof is less than 30% by weight or less relative to the total weight of the wet type nonwoven fabric. In particular, a polyethylene terephthalate short fiber, which is constituted of a stretched polyethylene terephthalate and has a single fiber fineness of from 0.05 to 0.6 dtex and fiber length of from 3 to 10 mm, is preferable from the standpoint of dimensional stability and the like.

Regarding the production method of the wet type nonwoven fabric of the invention, a production method, in which papermaking is performed with an ordinary fourdrinier machine, short net papermaking machine, cylinder paper machine or by multiplayer papermaking while combining plural machines followed by heat treatment, is preferable. On this occasion, regarding the heat treatment process, either a Yankee dryer or an air through dryer may be used, after the papermaking process. Further, calendar/emboss may be provided by use of metal/metal rollers, metal/paper rollers or metal/elastic rollers after the heat treatment. In particular, providing calendar processing or emboss processing to the nonwoven fabric of the invention exerts such effect as increase in strength due to the enhancement of the surface smoothness (uniformization of thickness) and formation of contact points. When a binder fiber B constituted of an unstretched fiber is employed, since a thermocompression process is necessary, such calendar processing or emboss processing is necessary.

In the wet type nonwoven fabric thus obtained, the basis weight of the nonwoven fabric is preferably in the range of from 20 to 500 g/m$^2$ (more preferably from 35 to 500 g/m$^2$, particularly preferably from 50 to 300 g/m$^2$). When the basis weight is less than 20 g/m$^2$, since the nonwoven fabric has too thin thickness, the strength thereof might be too low. When it exceeds 500 g/m$^2$, the stiffness of the nonwoven fabric might become too high.

As described above, since the wet type nonwoven fabric of the invention is formed by wet papermaking while using the short fiber A having a specified fiber diameter and fiber length and the binder fiber B in a specified weight, it is a wet type nonwoven fabric in which pores appearing on the surface of the wet type nonwoven fabric have a uniform pore diameter. On this occasion, for the pore diameter of pores appearing on the surface of the wet type nonwoven fabric, the ratio between the maximum pore diameter Ma and the average pore diameter Av, Ma/Av, is preferably 2 or less. Here, such pore diameter is to be determined by collecting a sample having a size of 3 cm×3 cm (square) from the wet type nonwoven fabric at an arbitrary position, and measuring the diameter of pores appearing on the surface of the sample for 5 random points to obtain the maximum pore diameter Ma and the average pore diameter Av. When the pore has a not truly circular shape, the major axis is defined as the pore diameter.

The filter of the invention is a filter constituted by using the wet type nonwoven fabric. As such filter, a chemical filter, an air filter, a liquid filter and the like are suitably exemplified. Further, another fabric may be laminated onto the wet type nonwoven fabric to form a filter, but the use of the wet type nonwoven fabric in a single layer is preferable. Since such filter uses the aforementioned wet type nonwoven fabric, it exerts an excellent collection efficiency. Meanwhile, since the wet type nonwoven fabric has uniform properties and very small pore diameter, it can very suitably be used as a filter, and, in addition, can also be used as a stencil for screen printing, a wiper, a separator of cell, artificial leather, and the like.

EXAMPLES

Next, Examples and Comparative Examples of the present invention are described in detail, but the invention is not limited by these.
(1) Melt Viscosity
A polymer after drying treatment was set to an orifice, whose temperature had been set to the melting temperature of an extruder at fiber spinning, and then molten and held for 5 minutes, which was extruded by giving several levels of load. Then, the shear rate was plotted relative to the melt viscosity at this time. Plotted points were smoothly connected to form a shear rate-melt viscosity curve, from which the melt viscosity at the shear rate of 1000 $sec^{-1}$ was picked up.
(2) Measurement of Dissolution Rate
Each of polymers for the sea component and the island component was discharged from a spinneret arranged with 24 capillaries having a diameter of 0.3 mm and a length of 0.6 mm and taken up at a fiber spinning rate of from 1000 to 2000 m/min. The thus obtained unstretched yarn was stretched so as to give a residual elongation in the range of from 30 to 60% to form a multifilament of 83 dtex/24 filament. The stretched product was made to have a bath ratio of 100 with a predetermined solvent at a predetermined dissolving temperature. Then, from the dissolution time and dissolved amount, the reduction rate was calculated.
(3) Fiber Diameter D
While using a transmission electron microscope TEM (provided with length measurement function), a fiber cross-sectional picture was taken at ×30000 and measured. Here, for the fiber diameter D, the diameter of the circumcircle at the transverse section of the fiber was used (average value based on n=5).
(4) Fiber Length L
Under a scanning electron microscopy (SEM), an ultrathin short fiber (short fiber A) before the dissolution and removal of the sea component was lain on a base, the fiber length L of which was measured at from ×20×500 (average value based on n=5). On this occasion, the length measurement function of the SEM was utilized to measure the fiber length L.
(5) Tensile Strength (Breaking Length)
Tensile strength (breaking length) was measured on the basis of JIS P8113 (Testing Method for Tensile Strength of Paper and Paper Board).

(6) Pore Diameter
While using a PMI Palm Porometer (based on ASTM E1294-89) manufactured by SEIKA CORPORATION, the maximum pore diameter Ma (μm) and the average pore diameter Av (μm) were measured. Products, in which the ratio of the maximum pore diameter Ma to the average pore diameter Av, Ma/Av, is 2 or less, are determined to be acceptable.
(7) Elongation
Elongation was measured on the basis of JIS P8132 (Testing Method for Elongation of Paper and Paper Board).
(8) Basis Weight
Basis weight was measured on the basis of JIS P8124 (Measuring Method of Meter Basic Weight of Paper).
(9) Thickness
Thickness was measured on the basis of JIS P8118 (Testing Method of Thickness and Density of Paper and Paper Board).
(10) Density
Density was measured on the basis of JIS P8118 (Testing Method of Thickness and Density of Paper and Paper Board).
(11) Melting Point
While using a differential thermal analyzer type 990 manufactured by Du Pont, melting point was measured at a temperature increasing rate of 20° C./min to obtain the melting peak. When the melting temperature could not be observed distinctly, a micro melting point meter (by Yanagimoto Mfg. Co., Ltd.) was used to determine a temperature at which the polymer softened and began to flow (softening point) as the melting point. The average based on n=5 was calculated.

Example 1

While using polyethylene terephthalate having melt viscosity of 120 Pa·sec at 285° C. for the island component and a modified polyethylene terephthalate formed by copolymerizing 4% by weight of polyethylene glycol having melt viscosity of 135 Pa·sec at 285° C. and the average molecular weight of 4000 and 9% by mole of 5-sodium sulfoisophthalic acid for the sea component, fiber spinning was performed at the weight ratio of sea:island=10:90 with a spinneret having the island number of 400, and then the product was taken up at a fiber spinning rate of 1500 m/min. Difference in alkali reduction rates was 1000 times. The product was stretched to ×3.9, cut to 1000 μm with a guillotine cutter to give a conjugate fiber for a short fiber A. After the reduction of the conjugate fiber by 10% with a 4% NaOH aqueous solution at 75° C., the generation of a ultrathin short fiber having a relatively uniform fiber diameter and fiber length was confirmed. Thus the fiber was determined to be the short fiber (fiber diameter: 750 nm, fiber length: 1 mm, L/D=1333, round cross-section).

Next, a core-sheath conjugate type binder short fiber (fineness: 1.1 dtex (fiber diameter: 10 μm), fiber length: 5 mm, with no crimp, core/sheath=50/50, core: polyethylene terephthalate having melting point of 256° C., sheath: copolymerized polyester that included telephthalic acid, isophthalic acid, ethylene glycol and diethylene glycol as the main components and had melting point of 110° C.) as the binder fiber B, and, in addition, a polyethylene terephthalate short fiber (fineness: 1.7 dtex (fiber diameter: 12 μm), fiber length: 5 mm, with no crimp) were mixed and stirred at a predetermined ratio (short fiber A/binder fiber B/another fiber=20/30/50). The resulting product was subjected to papermaking with TAPPI (square shape sheet machine by KUMAGAI RIKI KOGYO, hereinafter the same), followed by drying with a Yankee dryer (120° C.×2 minutes) to give a wet type nonwoven fabric having the basis weight of 50.3 g/m². Physical properties of the obtained wet type nonwoven fabric are shown in Table 1, and an electron microscopic picture of the cross-section of the wet type nonwoven fabric is shown in FIG. 1.

When an air filter obtained using such wet type nonwoven fabric was used, it was a filter excellent in the collection efficiency.

Example 2

A wet type nonwoven fabric was obtained through treatment/processing under the same conditions as in Example 1, except for changing the ratio of fibers used in Example 1 (short fiber A/binder fiber B/another fiber=50/30/20). Physical properties of the obtained wet type nonwoven fabric are shown in Table 1.

Example 3

A wet type nonwoven fabric was obtained through treatment/processing under the same conditions as in Example 1, except for changing the ratio of fibers used in Example 1 (short fiber A/binder fiber B/another fiber=20/50/30). Physical properties of the obtained wet type nonwoven fabric are shown in Table 1.

Example 4

A wet type nonwoven fabric was obtained under the same condition as in Example 1, except for changing the basis weight to 156.3 g/m² in the same raw stock constitution. Physical properties of the obtained wet type nonwoven fabric are shown in Table 1.

Example 5

A wet type nonwoven fabric was obtained under the same condition as in Example 1, except for changing the ratio of the short fiber A/binder fiber B used in Example 1 to 50% by weight and 50% by weight, respectively. Physical properties of the obtained wet type nonwoven fabric are shown in Table 1.

Comparative Example 1

A wet type nonwoven fabric was obtained through treatment/processing under the same conditions as in Example 1, except for changing the ratio of fibers used in Example 1 (short fiber A/binder fiber B/another fiber=3/50/47). Physical properties of the obtained wet type nonwoven fabric are shown in Table 1.

Comparative Example 2

A wet type nonwoven fabric was obtained through treatment/processing under the same conditions as in Example 1, except for changing the ratio of fibers used in Example 1 (short fiber A/binder fiber B/another fiber=30/60/10). Physical properties of the obtained wet type nonwoven fabric are shown in Table 1.

Comparative Example 3

Figure 2:
FIG. 2 is an electron microscopic picture of the cross-section of a wet type nonwoven fabric obtained in Comparative Example 3.

A wet type nonwoven fabric was obtained under the same conditions as in Example 1, except for using a stretched polyethylene terephthalate short fiber (fineness: 0.1 dtex (fiber diameter: 3 μm), fiber length: 3 mm, L/D=1000) in place of the short fiber A used in Example 1. Physical properties of the obtained wet type nonwoven fabric are shown in Table 1, and an electron microscopic picture of the cross-section of the wet type nonwoven fabric is shown in FIG. 2. When an air filter obtained using such wet type nonwoven fabric was used, the filter had a collection efficiency inferior to that of the air filter obtained in Example 1.

Comparative Example 4

A wet type nonwoven fabric was obtained under the same conditions as in Example 1, except for changing the fiber length of the short fiber A used in Example 1 to 2 mm (aspect ratio (L/D)=2667). Due to a large aspect ratio, the dispersibility deteriorated to form a sample with a lot of unevenness (not acceptable).

TABLE 1

| | Raw stock constitution | | | | | | | | | | |
|---|---|---|---|---|---|---|---|---|---|---|---|
| | Short fiber A | Binder fiber B | Another fiber (PET fiber) | | Property | | | Strength, Elongation | | Pore size (μm) | |
| | 750 nm × 1 mm L/D = 1333 | 1.1 dtex × 5 mm (L/D = 500) | 1.7 dtex × 5 mm (L/D = 403) | 0.1 dtex × 3 mm L/D = 1000 | Basis weight g/m² | Thickness mm | Density g/cm³ | Breaking length km | Elongation percentage % | Maximum pore diameter Ma | Average pore diameter Av | Ma/Av |
| Exam 1 | 20 | 30 | 50 | | 50.3 | 0.17 | 0.30 | 1.2 | 2.1 | 87.6 | 45.3 | 1.93 |
| Exam 2 | 50 | 30 | 20 | | 51.4 | 0.13 | 0.40 | 1.2 | 3.4 | 63.2 | 35.2 | 1.80 |
| Exam 3 | 20 | 50 | 30 | | 53.4 | 0.16 | 0.33 | 1.3 | 4.4 | 78.4 | 42.3 | 1.85 |
| Exam 4 | 20 | 30 | 50 | | 156.3 | 0.25 | 0.63 | 1.2 | 8.9 | 23.4 | 13.7 | 1.71 |
| Exam 5 | 50 | 50 | | | 49.5 | 0.10 | 0.50 | 1.2 | 5.3 | 19.5 | 12.3 | 1.59 |
| Comp Exam 1 | 3 | 50 | 47 | | 51.4 | 0.22 | 0.23 | 1.3 | 6.4 | 160.3 | 70.5 | 2.27 |
| Comp Exam 2 | 30 | 60 | 10 | | 50.6 | 0.18 | 0.28 | 1.4 | 4.3 | 99.6 | 45.6 | 2.18 |
| Comp Exam 3 | | 30 | 50 | 20 | 52.1 | 0.18 | 0.29 | 1.2 | 4.3 | 99.5 | 48.4 | 2.06 |

INDUSTRIAL APPLICABILITY

According to the present invention, it is possible to provide a wet type nonwoven fabric including two or more kinds of fibers, wherein the wet type nonwoven fabric can give filters excellent in the collection efficiency, and to provide a filter constituted by using the wet type nonwoven fabric. The industrial merit of the invention is extremely great.

The invention claimed is:

1. A wet type nonwoven fabric for a filter comprising two or more kinds of fibers, wherein the wet type nonwoven fabric comprises:
a short fiber A that consists of polyethylene terephthalate and has a fiber diameter D in the range of from 100 to 1000 nm and has a uniform diameter and the ratio of a fiber length L to the fiber diameter D, L/D, in the range of from 100 to 1333 in from 4 to 50% by weight relative to the total weight of the nonwoven fabric, and is formed by cutting a conjugate fiber comprising an island component that consists of polyethylene terephthalate and has an island diameter D of from 100 to 1000 nm, and a sea component constituted of a polymer that is readily soluble in an aqueous alkali solution as compared with polyethylene terephthalate, with a guillotine cutter, and then subjecting the conjugate fiber to an alkali reduction processing to dissolve and remove the sea component, and
a binder fiber B that has a single fiber fineness of 0.1 dtex or more in from 10 to 50% by weight relative to the total weight of the nonwoven fabric,
on the surface of the wet type nonwoven fabric, the ratio between the maximum pore diameter Ma and the average pore diameter Av, Ma/Av, is 2 or less, and
the elongation percentage of the wet type nonwoven fabric is in the range of from 2.1 to 4.4%.

2. A wet type nonwoven fabric according to claim 1, wherein the short fiber A is formed by cutting a conjugate fiber comprising an island component that consists of polyethylene terephthalate and has an island diameter D of from 550 to 800 nm, and a sea component constituted of a polymer that is readily soluble in an aqueous alkali solution as compared with the polyethylene terephthalate, and then subjecting the conjugate fiber to an alkali reduction processing to dissolve and remove the sea component.

3. A wet type nonwoven fabric according to claim 2 wherein, in the conjugate fiber, the sea component is constituted of polyethylene terephthalate copolymerized with 5-sodium sulfonic acid in from 6 to 12% by mole and polyethylene glycol having a molecular weight of from 4000 to 12000 in from 3 to 10% by weight.

4. A wet type nonwoven fabric according to claim 2, wherein, in the conjugate fiber, the number of the island is 100 or more.

5. A wet type nonwoven fabric according to claim 2, wherein, in the conjugate fiber, the conjugate weight ratio between the sea component and the island component (sea: island) is in the range from 20:80 to 80:20.

6. A wet type nonwoven fabric according to claim 1, wherein the binder fiber B is an unstretched polyester fiber formed by fiber-spinning polyester polymer at a fiber spinning rate of from 800 to 1200 m/min.

7. A wet type nonwoven fabric according to claim 1, wherein the binder fiber B is a core-sheath type conjugate fiber having a core portion constituted of polyethylene terephthalate, and the sheath portion constituted of a copolymerized polyester.

8. A wet type nonwoven fabric according to claim 1, wherein the basis weight of the wet type nonwoven fabric is in the range of from 20 to 500 $g/m^2$.

9. A wet type nonwoven fabric according to claim 1, wherein the short fiber A has a fiber diameter D in the range of from 550 to 1000 nm.

10. A wet type nonwoven fabric according to claim 1, wherein the short fiber A has a fiber diameter D in the range of from 550 to 800 nm.

11. A wet type nonwoven fabric according to claim 1, wherein the wet type nonwoven fabric further comprises a fiber other than short fiber A and binder fiber B, wherein the fiber other than short fiber A and binder fiber B is present in a content of less than 30% by weight relative to the total weight of the wet type nonwoven fabric.

12. A wet type nonwoven fabric according to claim 11, wherein the fiber other than short fiber A and binder fiber B comprises polyethylene terephthalate but does not satisfy another requirement of short fiber A.

13. A wet type nonwoven fabric according to claim 11, wherein the fiber other than short fiber A and binder fiber B comprises natural pulp.

14. A wet type nonwoven fabric according to claim 11, wherein the fiber other than short fiber A and binder fiber B comprises synthetic pulp.

* * * * *